US009885344B2

(12) United States Patent
Warren et al.

(10) Patent No.: US 9,885,344 B2
(45) Date of Patent: Feb. 6, 2018

(54) ENERGY RECOVERY DEVICE (71) Applicant: Exergyn Limited, Dublin (IE)

(72) Inventors: Keith Warren, Co. Carlow Borris (IE); Barry Cullen, Dublin (IE); Kevin O'Toole, Dublin (IE); Nicholas Breen, Co. Wexford Gorey (IE); Daniel Healy Grace, Co. Wicklow Blessington (IE); Robert Kelly, Dublin (IE)

(73) Assignee: Exergyn Limited, Dublin (IE)

( * ) Notice: Subject to any disclaimer, the term of this patent is extended or adjusted under 35 U.S.C. 154(b) by 589 days.

(21) Appl. No.: 14/365,214

(22) PCT Filed: Dec. 5, 2012

(86) PCT No.: PCT/EP2012/074566
§ 371 (c)(1),
(2) Date: Jun. 13, 2014

(87) PCT Pub. No.: WO2013/087490
PCT Pub. Date: Jun. 20, 2013

(65) Prior Publication Data
US 2015/0007558 A1  Jan. 8, 2015

(30) Foreign Application Priority Data

Dec. 13, 2011  (GB) .................................. 1121361.8

(51) Int. Cl.
*F03G 7/06*  (2006.01)
*F03G 1/00*  (2006.01)
(Continued)

(52) U.S. Cl.
CPC .............. *F03G 7/065* (2013.01); *F02B 73/00* (2013.01); *F02G 5/00* (2013.01); *F03G 1/00* (2013.01)

(58) Field of Classification Search
CPC ... F03G 7/065; F03G 1/00; F02G 5/00; F02B 73/00
(Continued)

(56) References Cited

U.S. PATENT DOCUMENTS

| 48,607 A | 7/1865 | Washburn |
| 3,703,693 A * | 11/1972 | Levinn ..................... F01P 11/14 |
| | | 137/386 |

(Continued)

FOREIGN PATENT DOCUMENTS

JP          S6022079          2/1985

*Primary Examiner* — Hoang Nguyen
(74) *Attorney, Agent, or Firm* — Occhiuti & Rohlicek LLP (57) ABSTRACT

The present application relates to the field of energy recovery and in particular to the use of shape memory alloys (SMA) for same. An energy recovery device is provided which comprises a one way drive mechanism for incrementally winding a spring. An SMA engine comprising a length of SMA material is fixed at a first end and connected at a second end to the one way drive mechanism. The SMA engine is housed in an immersion chamber and adapted to be sequentially filled with fluid to allow heating and/or cooling of the SMA engine to enable high frequency contractions and expansion. An output transmission is provided which is coupled to and driven by the spring. In this manner, repeated contractions of the SMA material incrementally wind the spring to store energy. The spring is restrained by a release mechanism which may be activated to allow the spring to drive an output transmission.

20 Claims, 9 Drawing Sheets

(51) Int. Cl.
*F02B 73/00* (2006.01)
*F02G 5/00* (2006.01)

(58) Field of Classification Search
USPC .................................................. 60/527–529
See application file for complete search history.

(56) References Cited

U.S. PATENT DOCUMENTS

| | | | | |
|---|---|---|---|---|
| 3,760,645 | A * | 9/1973 | Soto | F16H 31/005 |
| | | | | 264/202 |
| 4,302,939 | A | 12/1981 | Golestaneh | |
| 4,450,686 | A | 5/1984 | Banks | |
| 5,003,779 | A * | 4/1991 | Goldstein | F03G 7/065 |
| | | | | 60/527 |
| 5,255,518 | A * | 10/1993 | Urry | A61L 27/227 |
| | | | | 60/527 |
| 5,306,979 | A * | 4/1994 | Schwarz, Jr. | H02N 2/023 |
| | | | | 310/26 |
| 2011/0120116 | A1 | 5/2011 | Alexander | |

* cited by examiner

Fig. 9

ENERGY RECOVERY DEVICE

CROSS REFERENCE TO RELATED APPLICATION

This application is the national phase under 35 USC 371 of international application no. PCT/EP2012/074566, filed Dec. 5, 2012, which claims the benefit of the priority date of Great Britain application no. 1121361.8, filed Dec. 13, 2011. The contents of the aforementioned applications are incorporated herein in their entirety.

FIELD

The present application relates to the field of energy recovery and in particular to the use of shape memory alloys (SMA) for same.

BACKGROUND OF THE INVENTION

Low grade heat, which is typically considered less than 100 degrees, represents a significant waste energy stream in industrial processes, power generation and transport applications. Recovery and re-use of such waste streams is desirable. An example of a technology which has been proposed for this purpose is a Thermoelectric Generator (TEG). Unfortunately, TEG's are relatively expensive. Another largely experimental approach that has been proposed to recover such energy is the use of Shape Memory Alloys.

A shape-memory alloy (SMA) is an alloy that "remembers" its original, cold-forged shape which once deformed returns to its pre-deformed shape upon heating. This material is a lightweight, solid-state alternative to conventional actuators such as hydraulic, pneumatic, and motor-based systems.

The three main types of shape-memory alloys are the copper-zinc-aluminium-nickel, copper-aluminium-nickel, and nickel-titanium (NiTi) alloys but SMAs can also be created, for example, by alloying zinc, copper, gold and iron.

The memory of such materials has been employed or proposed since the early 1970's for use in heat recovery processes and in particular by constructing SMA engines which recover energy from heat as motion.

In a first type, referred to as a crank engine, of which U.S. Pat. No. 468,372 is an example, convert the reciprocating linear motion of an SMA actuator into continuous rotary motion, by eccentrically connecting the actuator to the output shaft. The actuators are often trained to form extension springs. Some configurations require a flywheel to drive the crank through the mechanism's limit positions. A related type are Swash Plate Engines, which are similar to cranks except that their axis of rotation is roughly parallel to the direction of the applied force, instead of perpendicular as for cranks.

A second type are referred to as a pulley engines, an example of which is U.S. Pat. No. 4,010,612. In pulley engines, continuous belts of SMA wire is used as the driving mechanism. A pulley engine may be unsynchronized or synchronized. In unsynchronized engines, the pulleys are free to rotate independently of one another. The only link between different elements is rolling contact with the wire loops. In contrast, in synchronized engines, the pulleys are constrained such that they rotate in a fixed relationship. Synchronization is commonly used to ensure that two shafts turn at the same speed or keep the same relative orientation.

A third type of SMA engine may be referred to as field engines, an example of which is U.S. Pat. No. 4,027,479. In this category, the engines work against a force, such as a gravitational or magnetic field.

A fourth type of SMA engine is that of Reciprocating Engines of which U.S. Pat. No. 4,434,618 in an example. These reciprocating engines operate linearly, in a back-and-forth fashion, as opposed to cyclically.

A fifth type of SMA engine is that of Sequential Engines of which U.S. Pat. No. 4,938,026 is an example. Sequential engines move with small, powerful steps, which sum to substantial displacements. They work like an inchworm, extending the front part by a small step and then pulling the back part along. With the back part nearby, the front part can extend again.

A sixth type of SMA engine is shown in U.S. Pat. No. 5,150,770A, assigned to Contraves Italiana S.p.A., and discloses a spring operated recharge device. There are two problems with the Contraves device, namely it is difficult to recharge quickly in a reciprocating manner and secondly it is difficult to discharge the energy to a transmission system without losses occurring.

A seventh type of SMA engine is shown in US patent publication number US2007/261307A1, assigned to Breezway Australia Pty Limited, and discloses an energy recovery charge system for automated window system. Breezway discloses a SMA wire that is coupled to a piston which is used to pump fluid to a pressurised accumulator. The piston therefore moves in tandem with the SMA wire as it contracts and expands. By coupling the SMA wire to the piston in this manner, the SMA wire is in indirect communication with the energy accumulator via the pumped fluid which is inefficient and the Breezway system suffers from the same problems as Contraves.

In addition one of the difficulties with each of these types of SMA engines has been that of the cycle period of the SMA material. SMA material is generally relatively slow to expand and contract (10's of RPM). It has been and remains difficult to achieve a worthwhile reciprocating frequency that might be usefully employed in an industrial application (100's to 1000's of RPM). This is not a trivial task and generally is complicated and involves significant parasitic power losses.

The present application is directed to solving at least one of the above mentioned problems.

SUMMARY OF THE INVENTION

According to the invention there is provided, as set out in the appended claims, energy recovery device comprising:
  a one way drive mechanism for incrementally winding a spring;
  a SMA engine comprising a length of SMA material fixed at a first end and connected at a second end to the one way drive mechanism;
  an immersion chamber adapted for housing the SMA engine and adapted to be sequentially filled with fluid to allow heating and/or cooling of the SMA engine; and
  an output transmission for coupling to and being driven by the spring; and a release mechanism activatable to allow the spring to drive the output transmission.

The present application overcomes the problem of low reciprocating frequency of the SMA material. The SMA material is heated by being immersed in a fluid in an immersion chamber using a hot fluid (e.g. water). Once the SMA material has contracted fully, the heating fluid is diverted and the SMA material is allowed cool. During the heating part of the cycle, the contracting SMA material drives a one way mechanism which in turn winds a spring. The SMA material is immersed sequentially in hot and cold fluids in order to bring about the contraction and expansion of the material. Heat transfer is primarily by forced convection from the fluid to the material as the fluid is pumped through the chamber. It will be appreciated that the fluid can be a gas in some embodiments. It will be further appreciated that the term immersion chamber should be interpreted to mean any housing adapted to accommodate the SMA engine or material.

In one embodiment the immersion chamber comprises an inlet and outlet for receiving and discharging the fluid.

In one embodiment the SMA engine is substantially immersed in fluid during one heating cycle.

In one embodiment heat transfer from the fluid to the SMA engine is primarily by forced convection as the fluid is pumped through the chamber.

In one embodiment there are a plurality of SMA engines each SMA engine being coupled to a one way drive mechanism for winding a common spring.

Once the SMA material has contracted, the energy from the SMA material has been stored in the spring. The SMA material is then allowed to cool. By using the one way mechanism, successive contractions of the SMA material are allowed to contribute energy to the spring until it is eventually fully wound.

When the spring is fully wound, the transmission system allows the energy to be discharged at will without interfering with the energy recovering portion of the system, the SMA material using a novel multiple clutch arrangement to enable incremental charging. The spring does not hamper the SMA material and does not force it into an unnatural reciprocating frequency. Advantageously, the present application allows the separation of the recovery portion of the energy system, and the deployment of the energy. This offers a means by which to overcome the problem of trying to match the relatively slow reciprocation of SMA engines to useful application. The energy stored in the spring for instance may be released suddenly for example to either an engine flywheel in a starter motor situation or to an electrical generator.

This approach is desirable as otherwise use in such applications would be precluded for SMA engines as they require relatively high frequencies that SMA engines generally are unable to provide. By using the proposed system, engine manufacturers (or those of other similar systems) could recover low grade heat energy and store it and deploy it at a desired time in a way that is more suitable to the existing hardware (engine flywheels, generators).

In a further embodiment of the invention there is provided an energy recovery device comprising:

a SMA engine comprising a length of SMA material fixed at a first end and connected at a second end to the one way drive mechanism;

a multiple clutch system adapted to provide incremental winding of a spring, said multiple clutch system comprising a first clutch mechanism connected to the spring and adapted such that rotation of the of the first clutch rotates the spring and a second clutch mechanism is positioned in such a way to prevent reverse movement of the first clutch mechanism; and an output transmission for coupling to and being driven by the spring; and a release mechanism activatable to allow the spring to drive the output transmission.

The multiple clutch system enables the SMA core to be sequentially charged and discharged whilst accumulating energy in the spring, effectively de-coupling the energy recovery portion of the operation (i.e. heat absorbed by the SMA material) from the energy delivery portion (release of the spring to drive the load). This decoupling can be enabled by the use of a ratchet or sprag or cam clutch, operated in reverse to prevent the energy stored in the spring from discharging back through the SMA or otherwise resisting the expansion/contraction of the SMA material.

Included in the multiple clutch system is a one-way clutch to enable the output to continue rotation when the spring has been fully discharged. In this manner, the energy is transferred from storage in the spring to mechanical work done by the output shaft. This allows the output to continue to operate under its own inertia while the spring/accumulator is recharged.

In one embodiment the second clutch mechanism is positioned in such a way to prevent reverse movement of the first clutch mechanism and adapted to allow incremental charging of the spring until a desired energy storage level is achieved.

In one embodiment a third clutch mechanism connected to the other end of the spring and adapted to be held in place by a brake when the spring is being charged.

In one embodiment the brake is adapted to be released forcing an inner race of the third clutch mechanism to rotate thereby passing energy stored in the spring to provide a continuous flywheel arrangement to the output transmission.

In one embodiment the third clutch comprises an outer race such that when the inner race rotates forces the outer race to rotate thereby passing energy stored in the spring to the output transmission.

In one embodiment the SMA engine comprises a linear SMA actuator core.

Accordingly, an embodiment of the application provides an energy recovery device as detailed in claims 1 and 18. The application also provides a method as detailed in claim 11. Advantageous embodiments are provided in the dependent claims.

BRIEF DESCRIPTION OF THE DRAWINGS

The present application will now be described with reference to the accompanying drawings in which.

DETAILED DESCRIPTION OF THE DRAWINGS

The proposed device represents a method by which to recover, convert, store and redeploy energy from low grade heat sources. The proposed method involves harnessing the Shape Memory Effect of certain alloys to generate a mechanical force.

An exemplary embodiment of the application will now be described with reference to FIG. 1 which provides energy recovery device employing a SMA engine indicated by reference numeral 1. The SMA engine 1 comprises an SMA actuation core. The SMA actuation core is comprised of SMA material clamped or otherwise secured at a first point which is fixed. At the opposing end, the SMA material is clamped or otherwise secured to a drive mechanism 2. Thus whilst the first point is anchored the second point is free to move albeit pulling the drive mechanism 3. An immersion chamber 4 adapted for housing the SMA engine and is adapted to be sequentially filled with fluid to allow heating and/or cooling of the SMA engine. Accordingly, as heat is applied to the SMA core it is free to contract. Suitably, the SMA core comprises a plurality of parallel wires, ribbons or sheets of SMA material. Typically, a deflection in and around 4% is common for such a core. Accordingly, when a 1 m length of SMA material is employed, one might expect a linear movement of approximately 4 cm to be available. It will be appreciated that the force that is provided depends on the mass of wire used. Accordingly, depending on the requirements of a particular configuration and the mass of SMA material needed 10's or 100's of wires\ribbons\sheets may be employed together in a single core.

A shaft is attached to the free end of the actuator core. This shaft supplies linear mechanical movement and force to a one way drive (transmission) mechanism. In the exemplary arrangement shown, the one way drive comprises a ratcheted rack gear driving a pinion gear 5. The pinion gear in turn is attached to and configured for winding an associated spring, suitably a coiled spring 6. It will be appreciated that while a spring is shown in FIG. 1 other energy storage devices could be used to perform the same function as the spring. When the SMA core 1 is heated and contracts, the rack gear meshes with the pinion gear causing it to rotate. The pinion gear is turn winds the spring 6. It will be appreciated that the spring will be sized to meet the requirements of a particular application. Industrial torsion springs are a good choice for the spring. Similarly, the rack and pinion arrangement may be sized according to application and the expected degree of movement from the SMA core.

A source of heat, in the form of the immersion chamber 4, is employed to cause contraction of the SMA core. Once the SMA has contracted, the source of heat may be removed and the SMA core allowed to cool. The SMA core may then expand. To ensure, the SMA core returns to its uncontracted state, a spring may be provided to longitudinally bias the SMA core to this uncontracted state. The size of this spring is small relative to the energy storage spring. In one embodiment the SMA engine or material in the actuator core is enclosed in the immersion chamber. The chamber 4 is adapted to be sequentially filled with hot and cold fluid (e.g. water), fully immersing the SMA material. The SMA material absorbs heat from the heated fluid when it passes through the chamber, causing contraction of the SMA. It subsequently releases heat to the cooler fluid when it passes through the chamber, thereby bringing about an expansion of the SMA material. The heated or cooled fluid can be supplied through inlet 9 and exit through outlet 10. By continuously cycling heated and cooled fluid through the chamber in this way, it is possible to cyclically heat and cool the SMA material, thereby producing usable mechanical work from the periodic contraction and return of the material.

Immersive heating offers advantages over prior art heating of the SMA through contact with a hot surface, such as is done when touching the material against the exterior of a heated pipe or other heated surface. One advantage of the immersion chamber over the prior art is the ability to place a significantly larger mass of working material (SMA) in direct contact with the heating fluid, enabling greater power density for the unit overall.

Once the SMA core is in its uncontracted state, the heat source may be re-applied causing the SMA core to contract and the spring via the rack and pinion arrangement to be wound further. The cycle may then as before continue with removal of the source of heat and cooling of the SMA core. In this way with each heating and cooling cycle, the SMA core contracts and expands and the spring is incrementally wound.

Whilst one end of the spring is connected to and wound by the pinion. The second end is connected to an output transmission shaft. The shaft is restrained from rotating by a release mechanism (brake) 10. The brake may be released in which case the energy in the spring is released through rotation of the output transmission shaft 11.

Thus in each cycle the system has successfully recovered the heat from the heat source and converted it to mechanical energy and in turn stored this energy in the spring.

The energy held within the spring may be released by disengaging the brake. The drive shaft 11 is then free to be rotated by the spring 6. In this manner, useful work may be recovered from the spring in one go, i.e. the relatively low energy incrementally stored from each cycle of the SMA engine may be released in one go.

In each cycle, after the contraction is complete, the heat source, i.e. hot fluid in immersion chamber 4, is removed through outlet 10 and the core allowed cool by either cool fluid entering inlet 9 or natural means. When the core has returned to its starting position, the heat source may again be applied, permitting the charging cycle to be repeated. In this manner, the spring can be coiled much further than if only one cycle was completed.

The advantage of this approach is that in contrast to previous SMA actuator concepts and designs which have attempted to recover useful work by using a relatively fast reciprocating motion involving the application of heating and cooling in a rapid sequence in order to create an oscillating shaft output for useful work, the storage of the energy in the spring for later use permits a longer period heating and cooling cycle which is much more suited to the specific characteristics of the SMA.

The heat recovery device has application in any situation where there is a low grade heat source available. Examples of applications are for use in automotive power plant, in power generation systems or to recover heat from industrial processes. The heat recovery device may also be used for charging flywheel based Uninterruptible Power Supply (UPS) systems, which are finding favour over battery based systems because of their durability and long life spans. For example, in server farms where significant amounts of heat are generated, energy might be recovered and used to provide an input drive to a flywheel based UPS.

Referring again to FIG. 1 a multiple clutch system permits the incremental charging of the spring 6 and its subsequent release according to another aspect of the invention. A one-way clutch 3, 5 is driven by the SMA core 1 via a suitable pinion gear, connecting rod or otherwise. This clutch 3, 5 is connected to the spring 6 via shaft 11 so that the rotation of the clutch 3, 5 rotates the spring 6. A second one way clutch 12, 13 (such as a ratchet mechanism, a sprag clutch or similar) is positioned and connected in such a way as to prevent the reverse movement of the first clutch 3, 5. When Clutch 3, 5 is therefore connected to the spring 6, this action would allow the incremental rotation of the spring 6.

A third one way clutch 14, 15 is connected to the first clutch 3, 5 via the spring 6. This third clutch 14, 15 is arranged in such a manner that an inner clutch race is connected to the spring 6 and an outer race to an output shaft or flywheel 16. This inner race is also arranged so that it may be held stationary using a brake.

Figure 1:
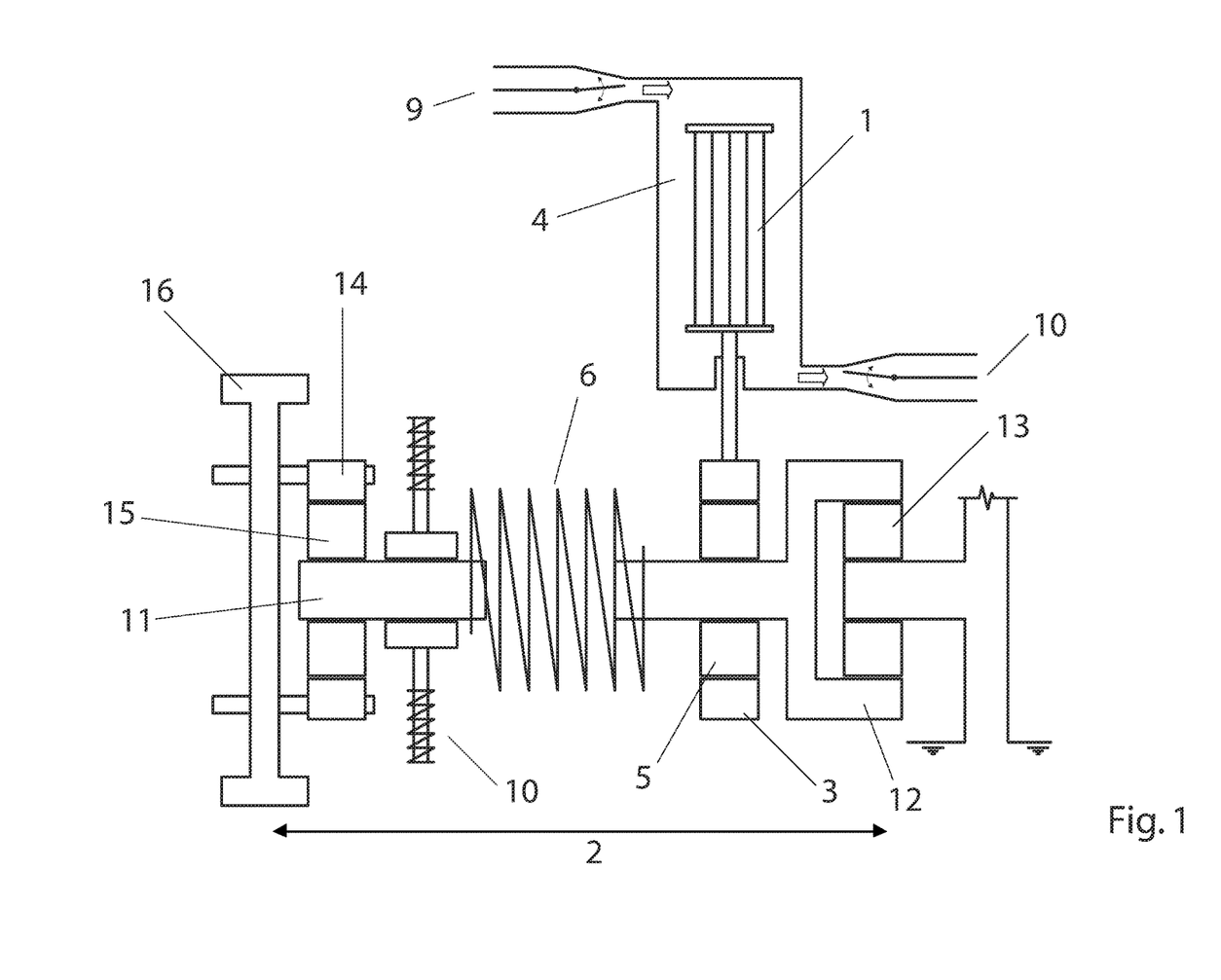
FIG. 1 is a first view of a first embodiment of the invention.
Figure 2:
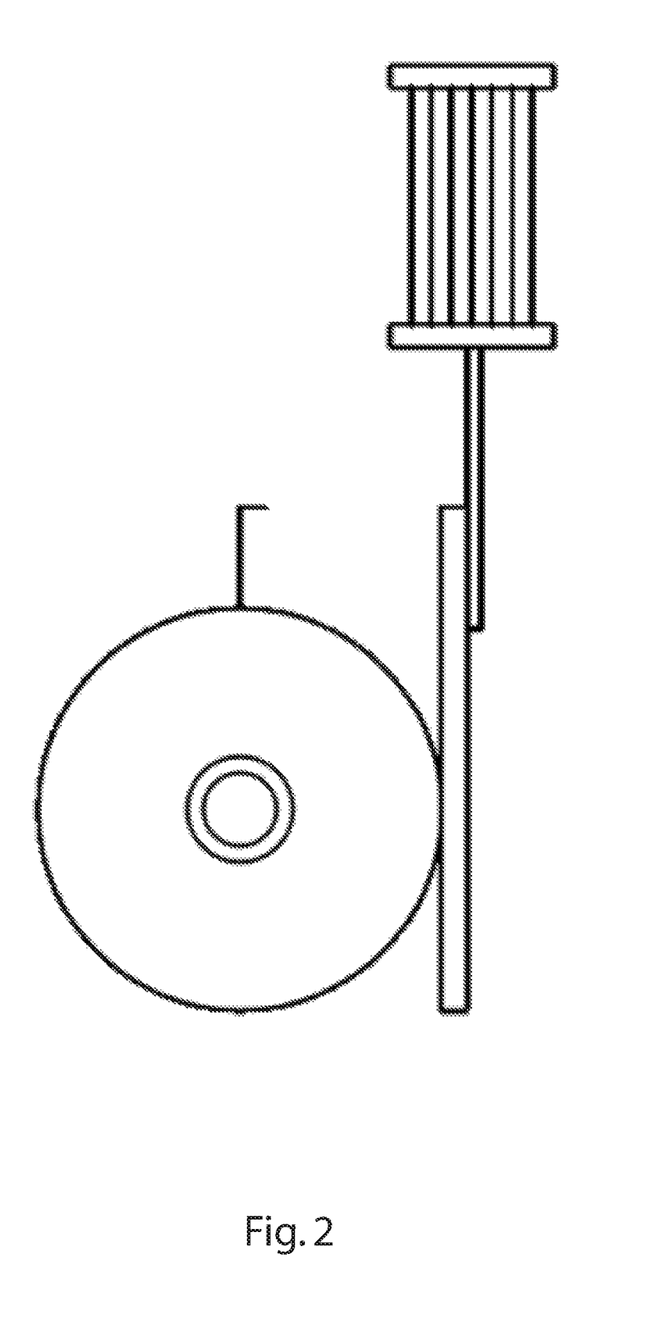
FIG. 2 is a further view of the embodiment of FIG. 1.
Figure 3:
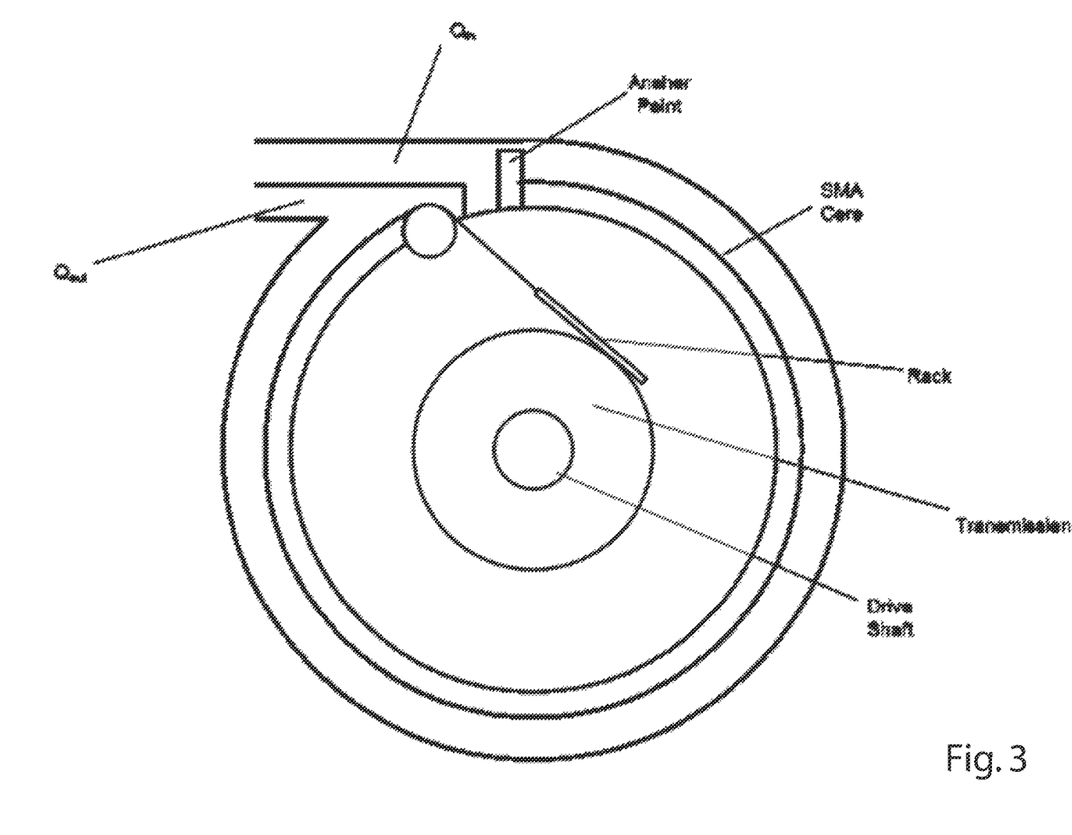
FIG. 3 is a circumferential arrangement of an SMA engine for use in the second embodiment.
Figure 4:
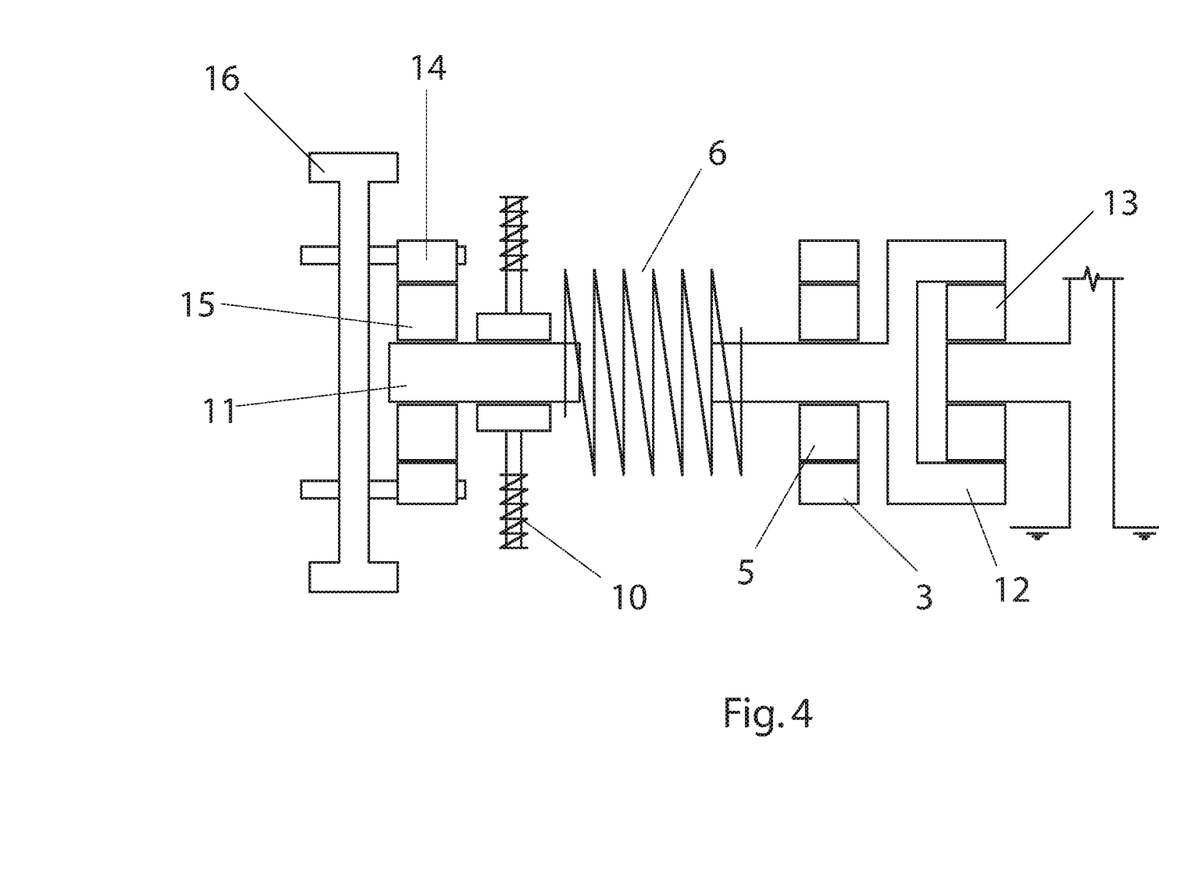
FIG. 4 is a view of the transmission system presented in FIG. 3.

The multiple clutch system hereinbefore described with respect to FIG. 1 is now described in more detail with respect to FIGS. 3 and 4. In operation Clutch 1 is caused to rotate by the contraction of the SMA core. Clutch 2 rotates also by the same amount. When the contraction is completed, both clutches cease movement. At this point, the SMA core connecting arm causes the outer race of clutch 1 to rotate back to its starting position. During this movement, clutch 2 prevents the inner race of clutch 1 from rotating back, thereby maintaining it in its position.

The inner race of Clutch 1 is connected to one end of a spring. The other end of the spring is connected to the inner race of Clutch 3. This inner race of Clutch 3 is held in place by the brake. Whilst the spring is being charged by Clutch 1, it is restrained at Clutch 3. This allows the spring to store energy contributed by the contraction of the SMA core. In addition, the ratcheting action of Clutch 2 means that Clutch 1 may be rotated by the SMA core a number of times in succession. In this manner, the spring may be incrementally charged until a desired energy storage level is achieved. When the energy is to be released, the brake at Clutch 3 is released. When this is done, the inner race of Clutch 3 is forced to rotate suddenly by the spring. The inner race in turn forces the outer race to rotate and thereby passes the energy stored in the spring to the output shaft/flywheel. Because Clutch 3 is also a one-way clutch, the outer race is free to maintain rotation, under the inertia of a flywheel or similar, after the inner race comes to rest after the spring is completely discharged. Advantageously, whilst the output shaft/flywheel continues to rotate, the inner race of Clutch 3 may be braked and the charging process started once again.

A second embodiment specifically directed at an automotive\internal combustion engine application will now be described.

Figure 5:
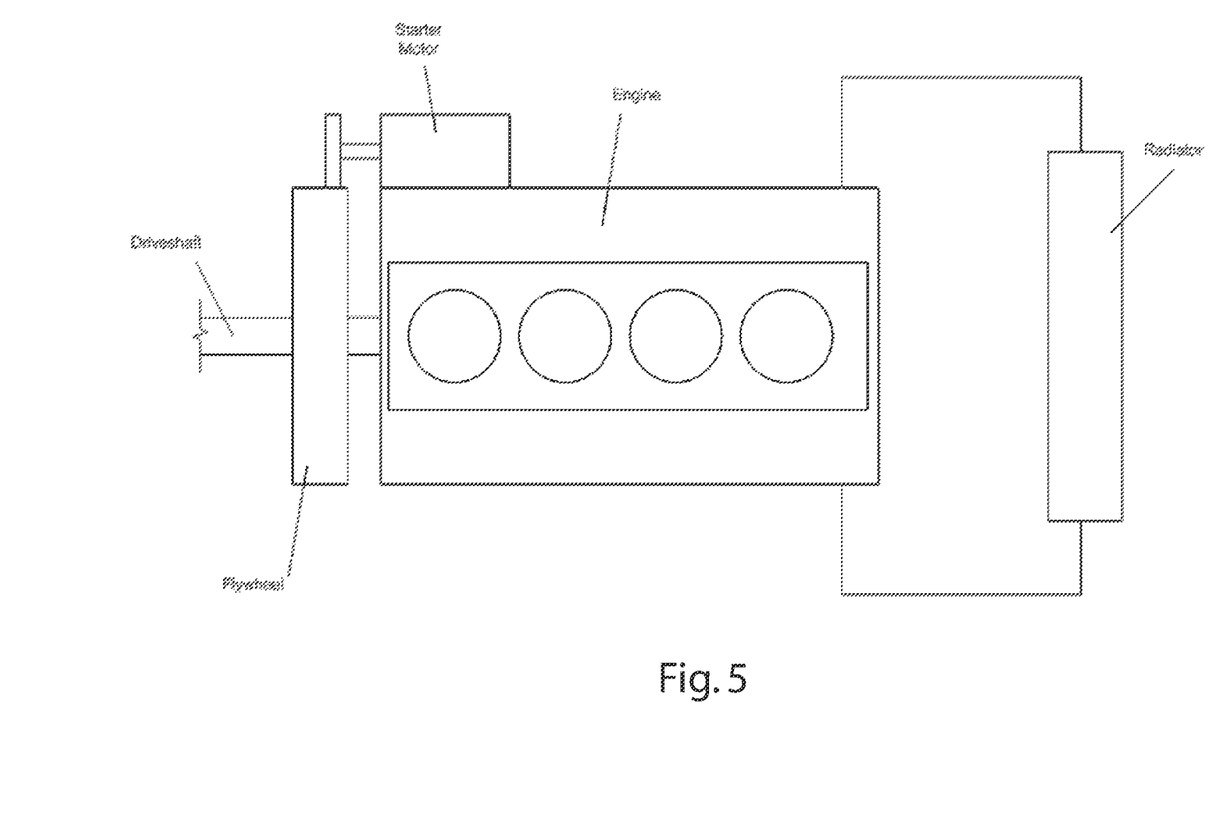
FIG. 5 is a schematic representation of a conventional internal combustion engine of a motor vehicle.

As would be familiar to people generally, as illustrated in FIG. 5, a conventional engine for a motor vehicle includes a flywheel that is driven by the motor typically an internal combustion engine. Heat generated in the engine is transferred to and dissipated by the radiator. A starter motor is connected to the flywheel and is used to turn over the engine when starting. Starter motors are conventionally electric.

In an engine system such as that which would be used in automotive applications or for power generation applications, a considerable quantity of the energy released through the combustion of the fuel is lost as low grade heat to the engine cooling water system. This heat is then rejected to atmosphere through a heat exchanger (radiator). Often, as much as 30% of the original fuel energy can be lost this way.

Figure 6:
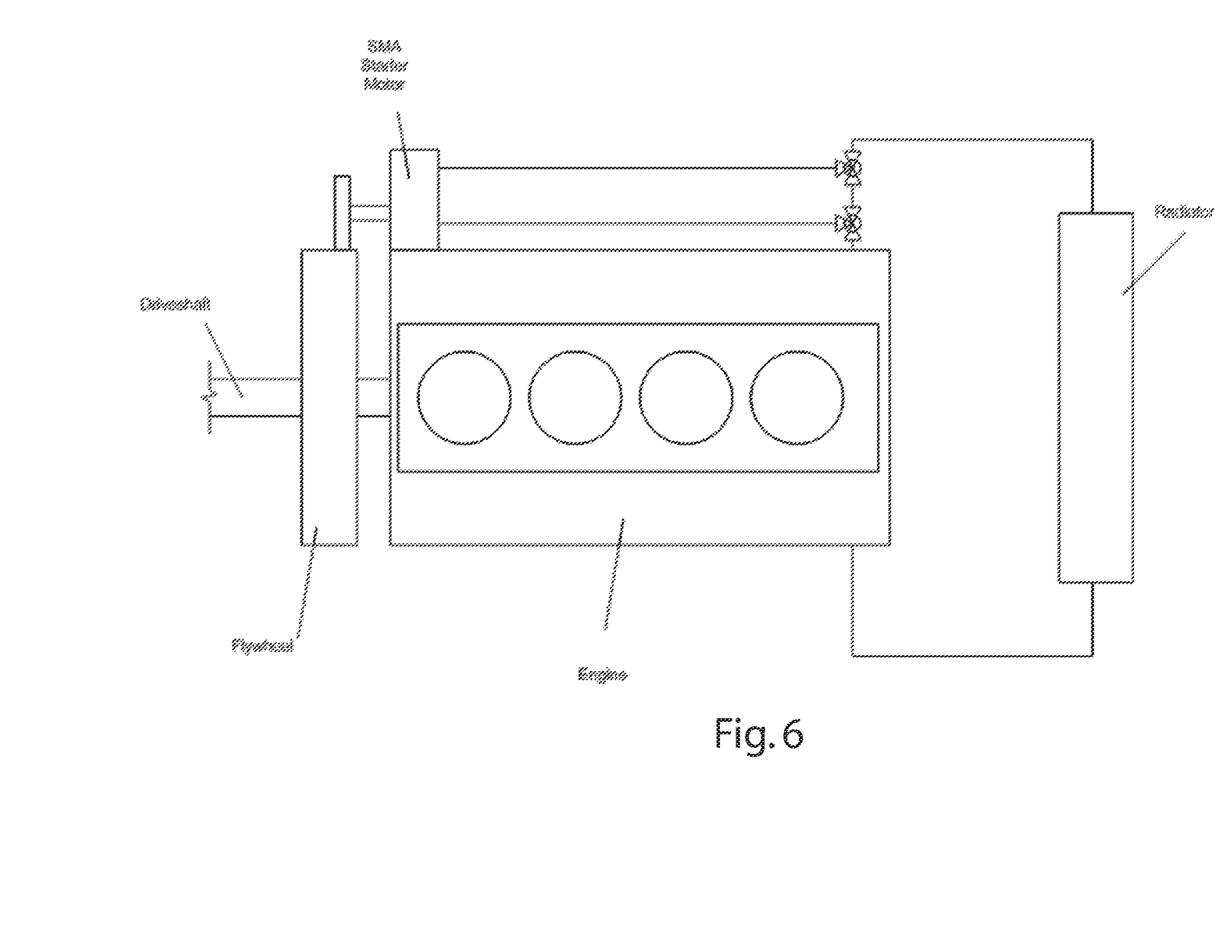
FIG. 6 is a representation of a second embodiment configured as a starter motor for use with the combustion engine of a motor vehicle.

The second embodiment provides a device\arrangement which may be used to recover, convert, store and redeploy energy from this low grade heat source. The proposed method involves harnessing the Shape Memory Effect in a broadly manner similar to that of the first embodiment, as shown in FIG. 6.

The arrangement provides the energy recovery device which recovers energy from waste heat and in turn stores this energy for subsequently starting the engine, i.e. the energy stored in the spring of the energy recovery device is used as the "starter motor" for turning over the engine when starting.

The SMA actuator is heated by heat contained within cooling fluid which is diverted from the normal path between the engine and the radiator. Valves or other switching means are provided to divert the cooling fluid as required to the SMA actuator. The valves may be operated on a timing cycle or in response to the operation of the SMA actuator. Whilst the arrangement of the energy recovery is broadly similar to the first embodiment, for ease of fitting with the space normally provided in the engine compartment for the starter motor the actuation core may be arranged circumferentially rather than linearly. Again a one way mechanism such as a ratcheted rack gear driving a pinion may be employed to incrementally wind the spring.

The energy held within the spring, as before, may be released by disengaging a brake whereupon the energy held in the spring is released via the drive shaft. The drive shaft is mechanically geared to the flywheel of the engine, via a clutch system, in order that mechanical energy stored within the spring may be released directly to the engine flywheel. In such a manner, the SMA actuator may act to partially or completely replace the starter motor of an engine.

Figure 7:
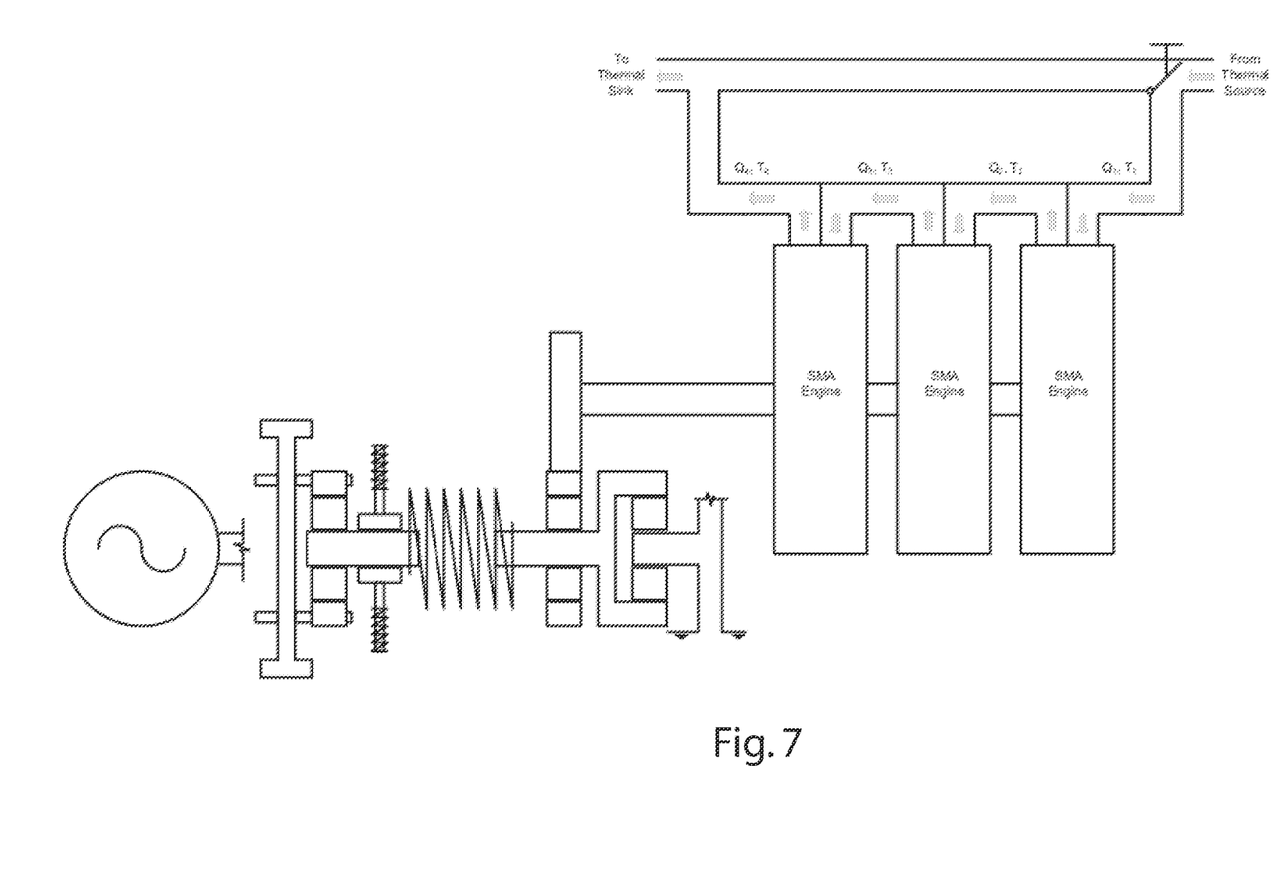
FIG. 7 is a further embodiment comprising a plurality of SMA actuators arranged in a cascade fashion.

Several SMA engines may be cascaded together to extract energy from a heat source, as shown for example in FIG. 7. In this arrangement, a plurality of SMA engines are connected to a shaft for winding the spring. Each SMA engine is positioned along the shaft and has a separate one way mechanism. This maximises the energy that may be recovered from waste heat stream, thus energy is extracted from a heat source (fluid) by a first engine before passing to a second engine and then to a third. This "cascade" or compound arrangement is possible due to the comparable inefficiency of the individual SMA cores (~4%), which means that there is still sufficient quantity of energy available in the waste heat stream, at a sufficient temperature to permit the inclusion of additional SMA cores on the outlet stream of the previous SMA core. The SMA cores may be arranged in such a way as to allow simultaneous charging of the power spring or alternatively may be staggered to allow sequential charging of the spring. Equally it will be appreciated that each SMA core may employ a separate spring. In the arrangement of FIG. 7, the drive shaft is connected to an electrical generator. The drive shaft may be released periodically to cause the electrical generator to produce power which may be used to charge a battery.

The present application allows for energy to be stored in a coiled spring through repeated ratcheting by SMA engine cycles over a given time period. This stored energy may be released on demand through an appropriate mechanical release mechanism. The released energy is transmitted by rotation of a shaft and may be used to provide mechanical work or to drive an electrical generator.

Unexpectedly the savings that may be available from using such a system are quite considerable as will now be explained with respect to an example using the configuration of FIG. 7.

For a 2-Liter petrol fuelled automotive engine, the following is an approximate energy balance:

| Thermal Sink | % |
|---|---|
| Shaft Power | 30% |
| Exhaust | 25% |

-continued

| Thermal Sink | % |
|---|---|
| Jacket Heat | 30% |
| Radiative & Other | 15% |

Taking an operating speed of 3000 Rpm and a brake power output of 30 kW, the engine jacket water output can therefore be taken as approximately 30 kW also.

Figure 8:
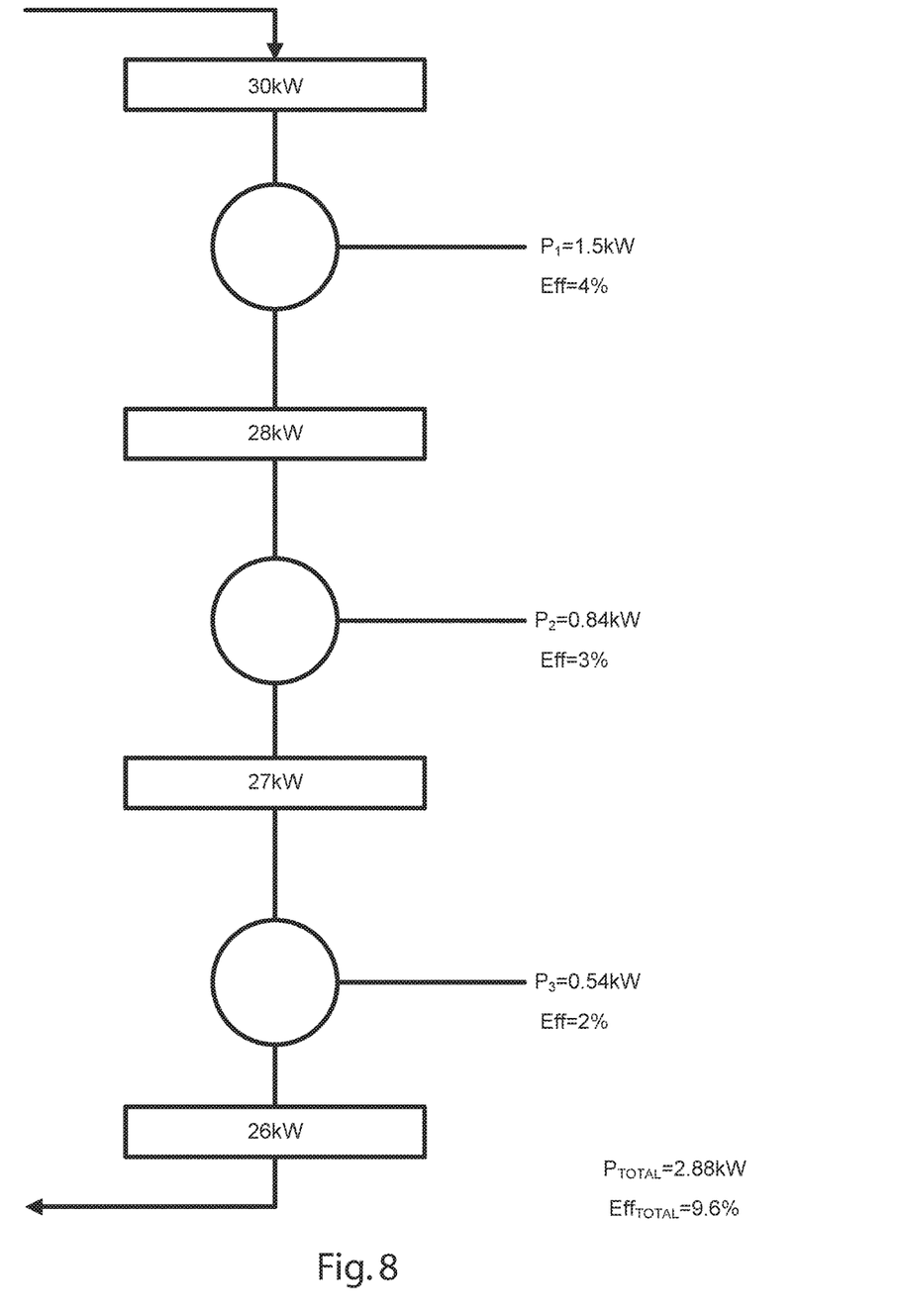
FIG. 8 illustrates exemplary power and efficiency figures for the cascade arrangement of FIG. 7.

Assuming the compound heat recovery system depicted in FIG. 8 and corresponding to the heat recovery system of FIG. 7, it may be observed that a 30 kW thermal supply (@ 90 deg C. approx) is supplied to the first SMA core. A conversion efficiency of approximately 4% is considered reasonable for an SMA core under such conditions, resulting in a power output of 1.5 kW.

Due to the low efficiency of the conversion, it can be assumed that the temperature drop across the converter is very low. Thus when the waste output stream is supplied to a second actuation core a power supply of approx 28 kW is presented with a 0.5 kw accounted for by unrecoverable heat loss to radiation, conduction etc.

As the temperature is lower in the second engine, there is a slight efficiency drop to 3%. A power output of 0.84 kW is provided by second core.

With the third core, the efficiency may be around 2%. Considering the waste stream from the second core, the power output from this actuation core is 0.54 kW. Total power output of the compound arrangement is therefore 2.88 kW, or 9.6% of the original 30 kW input.

It will be appreciated that is not fully correct to consider the instantaneous power output as there is a charging cycle involved and so it is more correct to consider the total energy recovered, in Joules.

Tests on a prototype system have indicated a total charging cycle time per actuation core of 1 min (20 seconds heating, 40 seconds cooling). Assuming the heating to occur for 20 seconds, the total energy recovery is:

$$E=\eta(\dot{Q}_{in}t)$$

Where $\eta E=\eta(\dot{Q}_{in}t)$ is the SMA core efficiency, $E=\eta(\dot{Q}_{in}t)$ $\dot{Q}_{in}$ is the waste heat supply and t is the charging time. This gives:

$$E_1=0.04(30000*0.0056)=0.0067 \text{ kWh}$$

Where t=0.0056 i.e. t=20 s/3600 s. This is to say that on each 1-minute charging cycle, 0.0067 kWh are recovered from the waste heat stream.

Completing similar calculations for core 2 and 3 gives:

$$E_2=0.03(28000*0.0056)=0.0047 \text{ kWh}$$

$$E_3=0.02(27000*0.0056)=0.003 \text{ kWh}$$

The total energy recovered in a given 1-minute charging cycle is therefore:

$$E_{total}=0.0067+0.0047+0.003=0.0144 \text{ kWh}$$

Whilst this may not appear significant, a significant point to consider is that in this case, the SMA engine is designed to supply an onboard electrical charging circuit. In current vehicles this is typically performed using an alternator that is directly driven by the driveshaft. The alternator, therefore, represents a direct parasitic load on the engine. Because it is supplied directly by the engine driveshaft, when considering the actual energy saving in terms of fuel, it is necessary to consider the engine brake fuel consumption i.e. the quantity of fuel that must be consumed in order to produce 1 kW of mechanical power at the drive shaft. With a reasonable efficiency value of 30%, it may be argued that every 1 kW that is supplied to the alternator by the drive shaft requires 3.3 kW of fuel energy to be combusted. For every 1 kW of electrical power displaced by the SMA engine, therefore, the actual real fuel saving is 3.3 kW. The value of 0.0144 kWh in energy recovered mentioned above therefore corresponds to a total saving of 0.048 kWh per 1-minute charging cycle.

To quantify the fuel saving over a typical automotive usage scenario, we therefore make the following assumption: a 2 liter petrol engine operating at charging load (3000 Rpm) for 90 minutes per day for 5 days per week over 50 weeks per year which is in accordance with average daily commuting times as compiled by the Central Statistics Office (CSO) in Ireland.

The total energy saving over the full year for this situation is therefore:

$$E_{saving,total}=0.048*90*5*50=1080 \text{ kWh}$$

An average Higher Calorific Value (HCV) for standard petrol is approximately 9.7 kWh. The total yearly saving in fuel for this scenario is therefore $$\text{Fuel Volume} = \left(\frac{1440}{9.7}\right) \text{kWh} = 111 \text{ Liters}$$

At current petrol prices (Rep. of Ireland Oct. 8, 2011) of approximately € 1.50/Liter, this corresponds to a total yearly fuel cost saving of € 167.

With average family car costing approximately € 2,000 per annum in fuel costs (AA Cost of Motoring 2011), this figure equates to approximately an 8% increase in fuel economy over the whole year.

However where the device is employed in a high-usage regimes, for example a taxi or other commercial vehicle which might be expected to operate for 8-12 hours per day. Assuming 8 hours of on-load (3000 Rpm) operation, the total fuel energy savings become:

$$E_{saving,total}=0.048*60*8*5*50=5760 \text{ kWh}$$

And the fuel volume savings therefore become:

$$\text{Fuel Volume} = \left(\frac{5760}{9.7}\right) \text{kWh} = 593 \text{ Liters}$$

Again, assuming current fuel costs at the pump of € 1.50/liter, the total annual saving becomes € 890.

Figure 9:
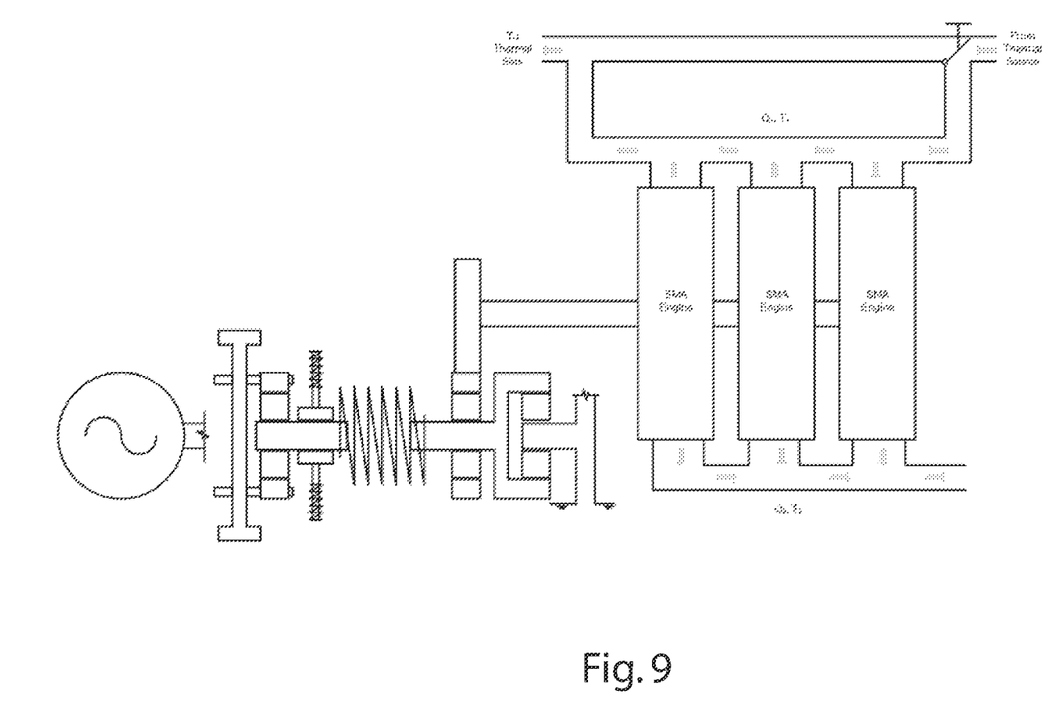
FIG. 9 is a further embodiment in which a plurality of SMA actuators are arranged in a parallel fashion.

In addition to the cascade arrangement of FIG. 7, it is also possible to provide combine several SMA engines in a parallel configuration in which the energy from a heat source is provided in parallel to each engine. Each SMA SMA engine may be connected to a common shaft for winding a common spring. Each SMA engine is positioned along the shaft and has a separate one way mechanism for winding the spring. The SMA cores may be arranged in such a way as to allow simultaneous charging of the power spring or alternatively may be staggered to allow sequential charging of the spring. Equally it will be appreciated that each SMA core may employ a separate spring. In the arrangement of FIG. 9, the drive shaft is connected to an electrical generator. The drive shaft is released periodically which causes the electrical generator to produce power which may be used to charge a battery. It will be appreciated that the configurations of FIGS. 7 and 9 may be employed together with several groups of SMA engines arranged in parallel as shown in FIG. 9, but with individual SMA engines within a group arranged in accordance in with FIG. 7.

When due care is taken to correctly size the springs and to match the load, it is possible to have the SMA engine system operate in a near-continuous fashion as opposed to operating with a charge cycle and a delayed release cycle as described previously.

This is achieved by specifying the spring and matching it to the driven load such that when it is discharged, it accelerates the load to a given operating speed such that this operating speed is greater than the charging cycle speed of the SMA core. For example, a flywheel may be employed as the load or as a buffer load. In this manner, the spring acts as a step-up transmission system.

By arranging a plurality of the SMA cores in either a series or parallel fashion as described above, it is possible to have periodic charging cycles operating in sequence, out of phase with each other. This is similar to the operating of pistons in a combustion engine. For example, three SMA cores could be arranged 120° out of phase. In this matter, a spring or springs might be charged by three charging pulses according to this phase difference. It will be appreciated that theoretically, it is possible to have any number of SMA cores operating in such a manner, either evenly out of phase i.e. equal gaps between each cycle, or unevenly out of phase, i.e. varying phase differences between SMA cores.

The spring or springs can similarly be discharged in such an out of phase manner by arranging the release mechanism to be timed in such a way as allows such out of phase discharge of the spring to the load. The pulses in the operation may be evened out by incorporating a flywheel at the spring output.

This in effect would allow for the system to act as a continuously operating motor which could be used to drive an electrical motor or similar in a continuous fashion.

The words comprises/comprising when used in this specification are to specify the presence of stated features, integers, steps or components but does not preclude the presence or addition of one or more other features, integers, steps, components or groups thereof.

The invention is not limited to the embodiments hereinbefore described but may be varied in both construction and detail.

The invention claimed is:
1. An energy recovery device comprising:
a one way drive mechanism for incrementally winding a spring;
a-SMA engine comprising a length of SMA material fixed at a first end and connected at a second end to the one way drive mechanism; an immersion chamber adapted for housing the SMA engine and adapted to be sequentially filled with fluid to allow heating and/or cooling of the SMA engine;
wherein a multiple clutch system comprises a first clutch mechanism connected to one end of the spring and including a clutch, the first clutch mechanism adapted such that rotation of the clutch rotates the spring and a second clutch mechanism is positioned in such a way to prevent reverse movement of the first clutch mechanism and adapted to allow incremental charging of the spring until a desired energy storage level is achieved;
a third clutch mechanism connected to the other end of the spring and adapted to be held in place by a brake when the spring is being charged; and
an output transmission for coupling to and being driven by the spring; and a release mechanism activatable to allow the spring to drive the output transmission.

2. An energy recovery device according to claim 1, wherein the immersion chamber comprises an inlet and outlet for receiving and discharging the fluid.

3. An energy recovery device according to claim 1, wherein the SMA engine is substantially immersed in fluid during one heating cycle.

4. An energy recovery device of claim 1 wherein heat transfer from the fluid to the SMA engine is primarily by forced convection as the fluid is pumped through the chamber.

5. An energy recovery device according to claim 1, wherein there are a plurality of SMA engines each SMA engine being coupled to a one way drive mechanism for winding a common spring.

6. An energy recovery device according to claim 1 wherein the multiple clutch system is adapted to provide incremental winding of the spring.

7. The energy recovery device of claim 1 wherein the brake is adapted to be released forcing an inner race of the third clutch mechanism to rotate thereby passing energy stored in the spring to provide a continuous flywheel arrangement to the output transmission.

8. The energy recovery device of claim 7 wherein the third clutch comprises an outer race such that when the inner race rotates the outer race is forced to rotate thereby passing energy stored in the spring to the output transmission.

9. The energy recovery device of claim 8 wherein the outer race is adapted to keep rotating when a brake condition is applied to the inner race.

10. An energy recovery device according to claim 1, wherein the SMA engine comprises a linear SMA actuator core.

11. An energy recovery device according to claim 1, wherein the SMA engine comprises a circumferentially arranged SMA actuator core.

12. An energy recovery device according to claim 1 further comprising a generator driveable by the output transmission.

13. A starter motor comprising an energy recovery device as claimed in claim 1.

14. A vehicle comprising a starter motor comprising an energy recovery device of claim 1 and further comprising an arrangement for diverting fluid from the engine cooling jacket to the energy recovery device.

15. A UPS comprising a flywheel and an energy recovery device according to claim 1, wherein the flywheel is driven by the output transmission of the energy recovery device.

16. An energy recovery device comprising:
a SMA engine comprising a length of SMA material fixed at a first end and connected at a second end to the one way drive mechanism;
a multiple clutch system adapted to provide incremental winding of a spring, said multiple clutch system comprising a first clutch mechanism connected to the spring and including a first clutch, the first clutch mechanism adapted such that rotation of the of the first clutch rotates the spring and a second clutch mechanism is positioned in such a way to prevent reverse movement of the first clutch mechanism;
comprising a third clutch mechanism connected to the other end of the spring and adapted to be held in place by a brake when the spring is being charged wherein the brake is adapted to be released forcing an inner race of the third clutch mechanism to rotate thereby passing energy stored in the spring to provide a continuous flywheel arrangement to the output transmission; and an output transmission for coupling to and being driven by the spring; and a release mechanism activatable to allow the spring to drive the output transmission.

17. The energy recovery device as claimed in claim 16 wherein the second clutch mechanism is adapted to allow incremental charging of the spring until a desired energy storage level is achieved.

18. The energy recovery device as claimed in claim 16 wherein the third clutch mechanism comprises a third clutch and an outer race such that when the inner race rotates the outer race is forced to rotate thereby passing energy stored in the spring to the output transmission.

19. The energy recovery device as claimed in claim 18 wherein the outer race is adapted to keep rotating when a brake condition is applied to the inner race.

20. An energy recovery device according to claim 16, wherein the SMA engine comprises a linear SMA actuator core.

* * * * *